US00RE42425E

(19) United States
(12) Reissued Patent
DeJonge et al.

(10) Patent Number: US RE42,425 E
(45) Date of Reissued Patent: Jun. 7, 2011

(54) DIMMER HAVING A POWER SUPPLY MONITORING CIRCUIT

(75) Inventors: Stuart DeJonge, Riegelsville, PA (US); Russikesh Kumar, Hoboken, NJ (US)

(73) Assignee: Lutron Electronics Co., Inc., Coopersburg, PA (US)

(21) Appl. No.: 12/481,224

(22) Filed: Jun. 9, 2009

Related U.S. Patent Documents

Reissue of:
(64) Patent No.: 7,242,150
Issued: Jul. 10, 2007
Appl. No.: 11/127,864
Filed: May 12, 2005

(51) Int. Cl.
*H05B 37/02* (2006.01)

(52) U.S. Cl. ..... 315/225; 315/287; 315/308; 315/360

(58) Field of Classification Search ..... 315/209 R, 315/219, 223–226, 239, 241 R, 244, 246, 315/276, 283, 287, 291, 307, 308, 360, DIG. 4
See application file for complete search history.

(56) References Cited

U.S. PATENT DOCUMENTS

| | | | | |
|---|---|---|---|---|
| 3,471,771 | A | 10/1969 | Mortimer | |
| 4,242,627 | A | 12/1980 | Kisiel | |
| 4,300,090 | A | 11/1981 | Weber | |
| 4,321,523 | A | 3/1982 | Hammel | |
| 4,328,528 | A | 5/1982 | Kompelien | |
| 4,389,608 | A | 6/1983 | Dahl et al. | |
| 4,504,778 | A | 3/1985 | Evans | |
| 4,641,233 | A | 2/1987 | Roy | |
| 4,878,010 | A | 10/1989 | Weber | |
| 4,893,063 | A | 1/1990 | Pernyeszi | |
| 5,030,890 | A | 7/1991 | Johnson | |
| 5,081,411 | A | 1/1992 | Walker | |
| 5,214,369 | A | 5/1993 | McCrea | |
| RE35,220 | E | 4/1996 | Johnson | |
| 5,604,387 | A | 2/1997 | Cheyne | |
| 5,631,542 | A | 5/1997 | Lohr et al. | |
| 5,652,504 | A | 7/1997 | Bangerter | |
| 5,838,555 | A | 11/1998 | Lejeune et al. | |
| 5,903,139 | A | 5/1999 | Kompelien | |
| 6,057,674 | A | 5/2000 | Bangerter | |
| 6,061,259 | A | 5/2000 | DeMichele | |
| 6,111,368 | A * | 8/2000 | Luchaco | 315/307 |
| 6,169,391 | B1 | 1/2001 | Lei | |
| 6,205,041 | B1 | 3/2001 | Baker | |
| 6,347,028 | B1 | 2/2002 | Hausman et al. | |
| 6,566,768 | B2 | 5/2003 | Zimmerman et al. | |
| 6,657,418 | B2 | 12/2003 | Atherton | |
| 6,674,248 | B2 * | 1/2004 | Newman et al. | 315/247 |
| 6,727,665 | B2 * | 4/2004 | Yao | 315/247 |
| 7,005,762 | B2 | 2/2006 | Black et al. | |
| 7,193,404 | B2 * | 3/2007 | Weightman | 323/325 |
| 7,573,436 | B2 * | 8/2009 | Webb et al. | 343/866 |

* cited by examiner

*Primary Examiner* — Thuy Vinh Tran
(74) *Attorney, Agent, or Firm* — Mark E. Rose; Philip N. Smith

(57) ABSTRACT

A two-wire dimmer for control of a lighting load from an alternating-current (AC) power source includes a semiconductor switch, a power supply, and a control circuit. The power supply includes an energy storage input capacitor that is able to charge only when the semiconductor switch is non-conductive. The control circuit continuously monitors the voltage on the input capacitor and automatically decreases the maximum allowable conduction time of the semiconductor switch when the voltage falls to a level that will not guarantee proper operation of the power supply. The dimmer of the present invention is able to provide the maximum possible conduction time of the semiconductor switch at high end (i.e., maximum light intensity) while simultaneously ensuring sufficient charging time for proper operation of the power supply, and hence, the dimmer.

11 Claims, 5 Drawing Sheets

DIMMER HAVING A POWER SUPPLY MONITORING CIRCUIT

Matter enclosed in heavy brackets [ ] appears in the original patent but forms no part of this reissue specification; matter printed in italics indicates the additions made by reissue.

FIELD OF THE INVENTION

The present invention relates to a two-wire load control device, specifically a two-wire dimmer for electronic low-voltage (ELV) lighting loads.

BACKGROUND OF THE INVENTION

Low-voltage lighting, such as electronic low-voltage (ELV) and magnetic low-voltage (MLV) lighting, is becoming very popular. Low-voltage lamps allow for excellent, precise sources of illumination, extended lamp life, higher efficiencies than incandescent lamps, and unique lighting fixtures, such as track lighting. To power an electronic low-voltage lamp, an ELV transformer is required to reduce a line voltage (typically 120 $V_{AC}$ or 240 $V_{AC}$) to a low-voltage level (such as 12 volts or 24 volts) to power the ELV lamp.

Many prior art two-wire dimmers exist for control of ELV lighting loads. A conventional two-wire dimmer has two connections: a "hot" connection to an alternating-current (AC) power supply and a "dimmed hot" connection to the lighting load. Standard dimmers use one or more semiconductor switches, such as triacs or field effect transistors (FETs), to control the current delivered to the lighting load and thus control the intensity of the light. The semiconductor switches are typically coupled between the hot and dimmed hot connections of the dimmer.

Since an ELV transformer is normally characterized by a large capacitance across the primary winding, the ELV lighting load is typically dimmed using reverse phase-control dimming (often called "trailing-edge" dimming), in which the dimmer includes two FETs in anti-serial connection. One FET conducts during the first, positive half-cycle of the AC waveform and the other FET conducts during the second, negative half-cycle of the AC waveform. The FETs are alternately turned on at the beginning of each half-cycle of the AC power supply and then turned off at some time during the half-cycle depending upon the desired intensity of the lamp. To execute reverse phase-control dimming, many ELV dimmers include a microprocessor to control the switching of the FETs.

In order to provide a direct-current (DC) voltage to power the microprocessor and other low-voltage circuitry, the dimmer includes a power supply, such as a cat-ear power supply. A cat-ear power supply draws current only near the zero-crossings of the AC waveforms and derives its name from the shape of the waveform of the current that it draws from the AC supply. The power supply must draw current through the connected ELV lighting load. The FETs must both be turned off (non-conducting) at the times when the power supply is charging. So, the FETs cannot be turned on for the entire length of a half-cycle, even when the maximum voltage across the load is desired.

To ensure that the power supply is able to draw enough current to maintain its output voltage at all times, the FETs are turned off at the end of each half-cycle for at least a minimum off-time. The proper operation of the ELV dimmer is constrained by a number of worst-case operating conditions, such as high current draw by the low-voltage circuitry, worst-case line voltage input (i.e. when the AC power supply voltage is lower than normal), and worst-case load conditions (such as the number and the wattage of the lamps, the types of ELV transformers, and variations in the operating characteristics of the ELV transformers). By considering these worst-case conditions, the minimum off-time is determined by calculating the off-time that will guarantee that the power supply will charge fully for even the worst-case conditions. The resulting off-time generally ends up being a large portion of each half-cycle and constrains the maximum light level of the attached load.

However, the worst-case condition is not normally encountered in practice, and under typical conditions, the FETs could normally be turned off for a shorter amount of time at the end of each half-cycle, thus conducting current to the load for a greater amount of time resulting in a higher intensity of the load that is closer to the intensity achieved when only a standard wall switch is connected in series with the load. Prior art dimmers have held the minimum off-time constant under all conditions, and thus, have suffered from a small dimming range.

Thus, there exists a need for an ELV dimmer that includes a power supply and has an increased dimming range. More specifically, there exists a need for an ELV dimmer that includes a power supply and is able to drive an ELV lighting load above the maximum dimming level of prior art ELV dimmers without compromising the operation of the power supply.

SUMMARY OF THE INVENTION

According to the present invention, a two-wire dimmer for control of a lighting load from a source of AC voltage includes a semiconductor switch, a power supply, and a control circuit. The semiconductor switch is operable to be coupled between the source of AC voltage and the lighting load and has a conducting state and a non-conducting state. The power supply has an input that receives an input voltage and is operable to draw current from the source of AC voltage during the non-conducting state of the semiconductor switch. The control circuit is operable to control the semiconductor switch into the conducting state for an on-time each half-cycle of the AC voltage and is coupled to the input of the power supply for monitoring the input voltage of the power supply. The control circuit is operable to decrease the on-time when the input voltage of the power supply falls below a first predetermined level. Further, the control circuit is operable to increase the on-time when the input voltage rises above a second predetermined level greater than the first level.

DETAILED DESCRIPTION OF THE INVENTION

Figure 1:
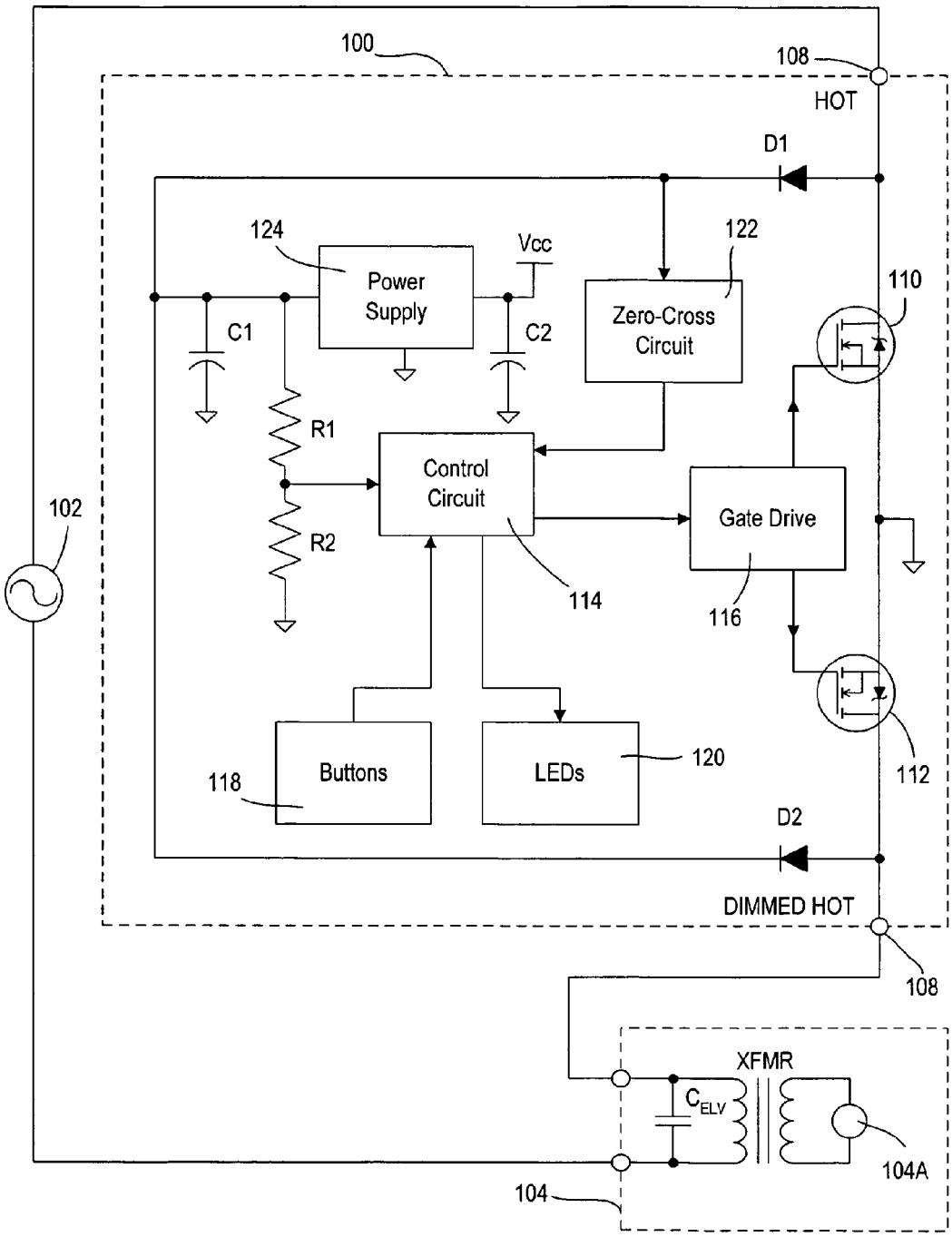
FIG. 1 is a simplified block diagram of the two-wire dimmer of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 shows the two-wire dimmer 100 of the present invention, which is connected in series between an AC power supply 102 and an ELV lighting load 104. The dimmer 100 has two connections: a HOT connection 106 to the AC power supply 102 and a DIMMED HOT connection 108 to the lighting load 104. Since ELV loads operate at a low-voltage level (such as 12 volts or 24 volts), a step-down transformer XFMR is required for the ELV lamp 104A. The ELV transformer XFMR is typically characterized by a large capacitance $C_{ELV}$ across the primary winding.

To control the AC voltage delivered to the ELV load 104, two field-effect transistors (FETs) 110, 112 are provided in anti-serial connection between the HOT terminal 106 and the DIMMED HOT terminal 108. The first FET 110 conducts during the positive half-cycle of the AC waveform and the second FET 112 conducts during the negative half-cycle of the AC waveform. ELV lighting loads are dimmed using reverse-phase control dimming, in which the FETs are alternately turned on at the beginning of each half-cycle of the AC power supply and then turned off at some time during the half-cycle depending upon the desired intensity of the lamp. The conduction state of the FETs 110, 112 is determined by a control circuit 114 that interfaces to the FETs through a gate drive circuit 116. To execute reverse-phase control dimming, the control circuit 114 includes a microprocessor to control the switching of the FETs 110, 112.

The ELV dimmer also includes a plurality of buttons 118 for input from a user, and a plurality of light emitting diodes (LEDs) 120 for feedback to the user. The control circuit 114 determines the appropriate dimming level of the ELV lamp 104A from the input from the buttons 118.

A zero-cross circuit 122 provides a control signal to the control circuit 114 that identifies the zero-crossings of the AC supply voltage. A zero-crossing is defined as the time at which the AC supply voltage equals zero at the beginning of each half-cycle. The zero-cross circuit 122 receives the AC supply voltage through diode D1 in the positive half-cycle and through diode D2 in the negative half-cycle. The control circuit 114 determines when to turn off the FETs each half-cycle by timing from each zero-crossing of the AC supply voltage.

In order to provide a DC voltage ($V_{CC}$) to power the microprocessor of the control circuit 114 and the other low-voltage circuitry, the dimmer 100 includes a power supply 124. The power supply 124 is only able to charge when the FETs 110, 112 are both turned off (non-conducting) and there is a voltage potential across the dimmer. Since there are only two connections on a two-wire dimmer, the power supply must draw a leakage current through the connected ELV lighting load 104. For example, during the positive half-cycle, current flows from the AC supply 102 through diode D1 to the power supply 124 and then, via circuit common, out through the body diode of the second FET 112 and through the load 104 back to the AC supply. The power supply 124 may be implemented as a "cat-ear" power supply, which only draws current near the zero-crossings of the AC waveform, or as a standard switch-mode power supply.

In a typical two-wire dimmer, the power supply 124 is implemented as a "cat-ear" power supply, which only draws current near the zero-crossings of the AC waveforms. The power supply 124 has an input capacitor C1 and an output capacitor C2. The output capacitor C2 holds the output of the power supply Vcc at a constant DC voltage to provide power for the control circuit 114. The input of the power supply 124 is coupled to the Hot and Dimmed Hot terminals through the two diodes D1, D2, such that the input capacitor C1 charges during both the positive and negative half-cycles.

The dimmer 100 also includes a voltage divider that comprises two resistors R1, R2 and is coupled between the input of the power supply 124 and circuit common. The voltage divider produces a sense voltage $V_S$ at the junction of the two resistors. The sense voltage $V_S$ is provided to the control circuit 114 such that the control circuit is able to monitor the voltage level at the input of the power supply 124. The microprocessor in the control circuit 114 preferably includes an analog-to-digital converter (ADC) for sampling the value of the sense voltage $V_S$. The resistors R1, R2 are preferably sized to ensure that the maximum voltage at the pin of the microprocessor of the control circuit 114 does not exceed the power supply output $V_{CC}$. For example, if the input voltage to the waveform is 240 $V_{RMS}$ and the power supply output $V_{CC}$ is 3.3 $V_{DC}$, then the values of R1 and R2 can be sized to 450 kΩ and 3 kΩ, respectively, in order to ensure that the magnitude of the sense voltage is less than 3.3 $V_{DC}$. Alternatively, the voltage divider could be coupled between the output voltage (or another operating voltage) of the power supply 124 and circuit common to provide a signal to the control circuit 114 that is representative of the present operating conditions of the power supply.

According to the present invention, the control circuit 114 monitors the sense voltage $V_S$ and decreases the conduction times of the FETs 110, 112 when the sense voltage $V_S$ drops below a first predetermined voltage threshold $V_1$. Further, the control circuit 114 increases the conduction times of the FETs 110, 112 when the sense voltage then rises above a second predetermined voltage threshold $V_2$, greater than the first threshold. In a preferred embodiment of the present invention (when used with an input voltage of 240 $V_{RMS}$), the first and second voltage thresholds $V_1$ and $V_2$ are set to 0.67 $V_{DC}$ and 0.8 $V_{DC}$, respectively, which correspond to voltages of 100 $V_{DC}$ and 120 $V_{DC}$ at the input of the power supply 124. Alternatively, if the microprocessor does not include an ADC, the dimmer 100 could include a hardware comparison circuit, including one or more comparator integrated circuits, to compare the sense voltage with the first and second voltage thresholds and then provide a logic signal to the microprocessor.

Figure 2A:
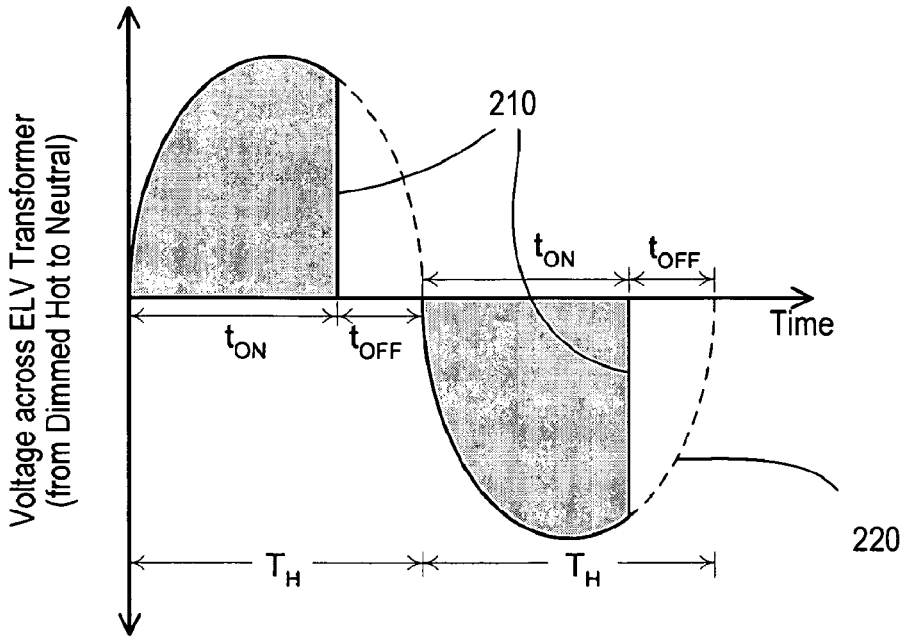
FIG. 2a is a waveform of the dimmed hot voltage of the dimmer of FIG. 1.

FIG. 2a shows examples of a dimmed hot voltage 210 measured from the Dimmed Hot terminal 108 of the dimmer 100 to neutral (i.e. the voltage across the lighting load 104). The dashed line represents the AC voltage 220 measured across the AC power supply 102. The period of the AC voltage 220 is split into two equal half-cycles having periods $T_H$. The dimmed hot voltage 210 has a value equal to the AC voltage 220 during the time $t_{ON}$ when one of the FETs is conducting. Conversely, the dimmed hot voltage 210 has a value equal to zero during the time $t_{OFF}$ when neither FET is conducting. The control circuit 114 is able to control the intensity of the load by controlling the on-time $t_{ON}$. The longer the FETs conduct during each half-cycle, the greater the intensity of the lighting load 104 will be.

Figure 2B:
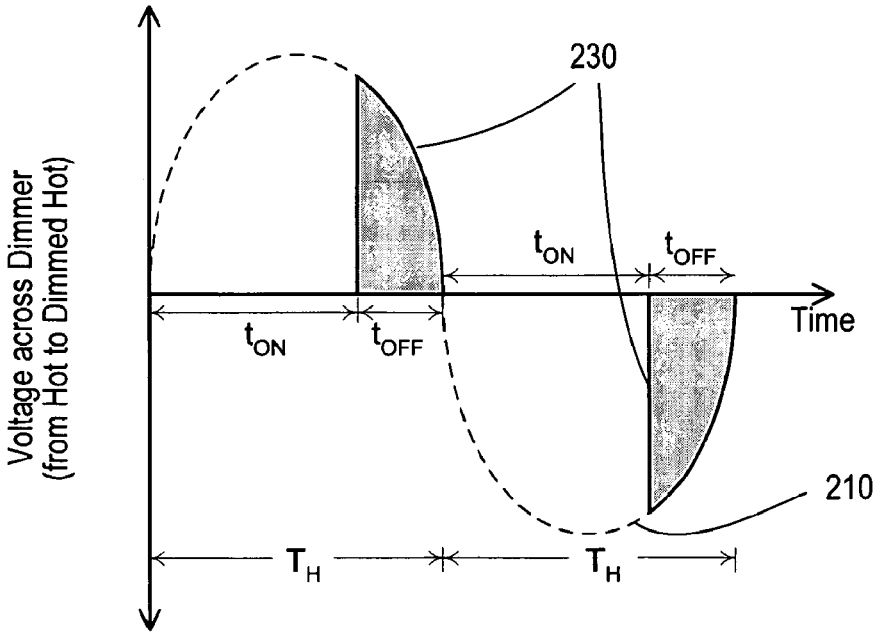
FIG. 2b is a waveform of the voltage across the dimmer of FIG. 1.

FIG. 2b shows an example of the dimmer voltage 230 measured from the Hot terminal 106 to the Dimmed Hot terminal 108 of the dimmer (i.e. the voltage across the dimmer) The power supply 124 is only able to charge during the off-time $t_{OFF}$ because the off-time is the only time during each half-cycle when there is a voltage potential across the FETs and thus across the power supply 124. Conversely, when the FETs are conducting during the on-time $t_{ON}$, the FETs form a low impedance path through the dimmer 100 and the input capacitor C1 of the power supply 124 is unable to charge.

With prior art ELV dimmers, a maximum off-time$t_{OFF\text{-}MAX\text{-}WC}$ needed to charge the power supply during worst-case conditions was used to determine the maximum on-time $t_{ON\text{-}MAX\text{-}WC}$ of the dimmer. The worst-case conditions may include a low-line AC input voltage or a high current drawn from the power supply by the microprocessor and other low-voltage components. However, the dimmer is not always operating with the worst-case conditions and it may be possible to increase the on-time above the maximum on-time $t_{ON\text{-}MAX\text{-}WC}$ in order to provide a greater light output of the lighting load 104 at high-end.

The dimmer 100 of the present invention has a maximum on-time limit, $t_{ON\text{-}MAX\text{-}LIMIT}$ that is greater than the worst-case on-time $t_{ON\text{-}MAX\text{-}WC}$. The maximum on-time limit $t_{ON\text{-}MAX\text{-}LIMIT}$ of the dimmer 100 is determined from the appropriate off-time required to charge the input capacitor C1 of the power supply 124 during normal operating conditions. The dimmer 100 also has a dynamic maximum on-time, $t_{ON\text{-}MAX}$, that the control circuit 114 is operable to control from one half-cycle to the next. The dynamic maximum on-time $t_{ON\text{-}MAX}$ cannot exceed the maximum on-time limit $t_{ON\text{-}MAX\text{-}LIMIT}$, but can be decreased below the limit in order to increase the off-time of the FETs to allow the input capacitor C1 of the power supply 124 more time to charge. By driving the on-time of the FETs above the worst-case on-time $t_{ON\text{-}MAX\text{-}WC}$, the dimmer 100 of the present invention is able to achieve a greater light output of the connected lighting load 104 than prior art ELV dimmers. However, when the on-time of the FETs is greater than the worst-case on-time $t_{ON\text{-}MAX\text{-}WC}$, there is a danger of the input capacitor C1 not having enough time to charge in during the off-time of the half-cycle.

By monitoring the input of the power supply 124, the control circuit 114 of the dimmer 100 of the present invention is able to determine when the input voltage has dropped to a level that is inappropriate for continued charging of the input capacitor C1. For example, if the sense voltage $V_S$ falls below a first voltage threshold $V_1$, then the capacitor C1 needs a greater time to properly charge and the on-time is decreased. On the other had, if the sense voltage $V_S$ remains above the first voltage threshold $V_1$, the input capacitor C1 is able to properly charge each half-cycle.

Figure 3:
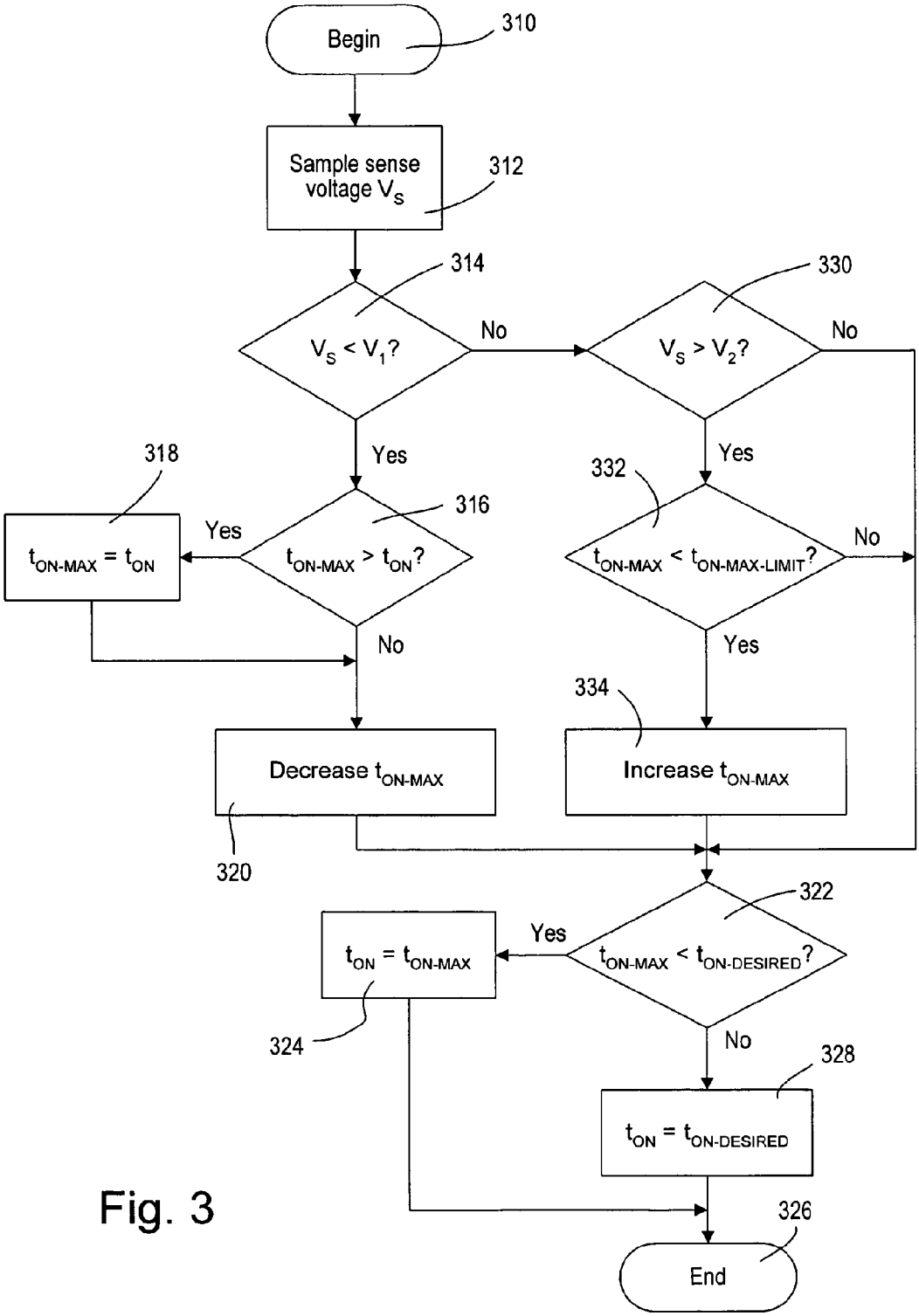
FIG. 3 is a flowchart of the process implemented by a control circuit of the dimmer of FIG. 1.

FIG. 3 shows a flowchart of the process for monitoring the sense voltage $V_S$ and determining whether to change the on-time $t_{ON}$ in response to the value of the sense voltage $V_S$. The process of FIG. 3 runs each half-cycle of the AC voltage. The on-time $t_{ON}$ is changed in response to the maximum on-time $t_{ON\text{-}MAX}$ being decreased or increased if the maximum on-time is less than a desired on-time, $t_{ON\text{-}DESIRED}$, of the dimmer. The desired on-time $t_{ON\text{-}DESIRED}$ is determined by the control circuit 114 from the inputs provided by the buttons 118. The maximum on-time $t_{ON\text{-}MAX}$ is only changed if the sense voltage $V_S$ is below the first voltage threshold $V_1$ or if the sense voltage $V_S$ is above the second voltage threshold $V_2$ and the maximum on-time $t_{ON\text{-}MAX}$ has not returned to the maximum on-time limit, $t_{ON\text{-}MAX\text{-}LIMIT}$, of the dimmer 100.

The flowchart of FIG. 3 begins at step 310 at the beginning of each half-cycle. First, at step 312, the sense voltage $V_S$ is sampled once immediately after the FETs are turned off. If the sampled sense voltage $V_S$ is less than the first voltage threshold $V_1$ at step 314 and the maximum on-time $t_{ON\text{-}MAX}$ is greater than the present on-time $t_{ON}$ at step 316, the dimmer has detected that the sense voltage has dropped below the first voltage threshold $V_1$. Then, the maximum on-time $t_{ON\text{-}MAX}$ is set to the present on-time $t_{ON}$ at step 318 and the maximum on-time $t_{ON\text{-}MAX}$ is decreased by a first predetermined time increment $t_1$ at step 320. The first predetermined time increment $t_1$ preferably corresponds to 1% of the dimming range. If the maximum on-time $t_{ON\text{-}MAX}$ is less than the present on-time $t_{ON}$ at step 318, the maximum on-time $t_{ON\text{-}MAX}$ is decreased by a first predetermined time increment $t_1$ at step 320.

At step 322, a determination is made as to whether the maximum on-time $t_{ON\text{-}MAX}$ is less than the desired on-time $t_{ON\text{-}DESIRED}$. If so, the on-time $t_{ON}$ is set to the present value of the maximum on-time $t_{ON\text{-}MAX}$ at step 324. Since the sense voltage is only sampled after the FETs are turned off (at step 312), the change to the on-time $t_{ON}$ at step 320 will affect the on-time of the dimmed hot voltage during the next half-cycle. The process then exits at step 326 for the current half-cycle to begin again at the beginning of the next half-cycle. If the maximum on-time $t_{ON\text{-}MAX}$ is greater than the desired on-time $t_{ON\text{-}DESIRED}$ at step 322, then the dimmer has returned to normal operating conditions. The desired on-time $t_{ON\text{-}DESIRED}$ is used as the on-time at step 328 and the process exits at step 326.

If the sense voltage $V_S$ is greater than the first voltage threshold $V_1$ at step 314 and the sense voltage is less than the second voltage threshold $V_2$ at step 330, then the maximum on-time $t_{ON\text{-}MAX}$ and thus the on-time $t_{ON}$ are not changed. If the sense voltage $V_S$ is greater than the second voltage threshold $V_2$ at step 330, the process moves to step 332 where a determination is made as to whether the present maximum on-time $t_{ON\text{-}MAX}$ is less than the maximum on-time limit $t_{ON\text{-}MAX\text{-}LIMIT}$. If not, the maximum on-time $t_{ON\text{-}MAX}$ has returned to the limit and the maximum on-time $t_{ON\text{-}MAX}$ and the on-time $t_{ON}$ are not changed. However, if the present maximum on-time $t_{ON\text{-}MAX}$ is greater than the maximum on-time limit $t_{ON\text{-}MAX\text{-}LIMIT}$ at step 332, then the maximum on-time $t_{ON\text{-}MAX}$ is increased by a second predetermined time increment $t_2$ for the next half-cycle at step 334. The second predetermined time increment $t_2$ preferably corresponds to 0.5% of the dimming range.

Figure 4:
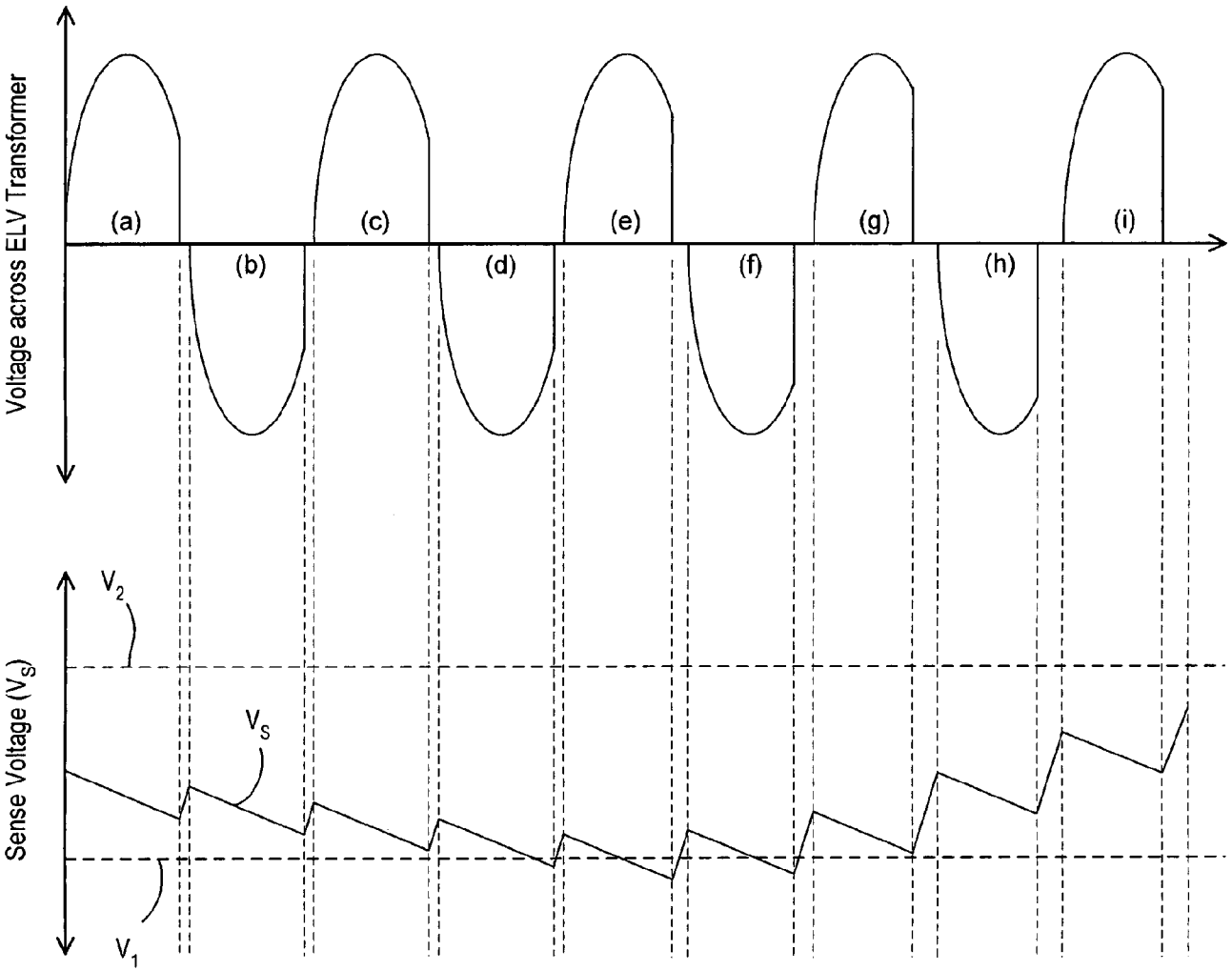
FIG. 4 shows voltage waveforms of the dimmer of FIG. 1 during a first part of the process of FIG. 3.

FIG. 4 shows the voltage waveforms of the dimmer 100 operating with in accordance with the present invention as the voltage at the input of the power supply 124 is falling. The upper waveform shows the dimmed hot voltage, which is across the ELV load 104. In the first few line cycles (a), (b), (c), and (d), the dimmed hot voltage is zero for only a small off-time at the end of each half-cycle. The lower waveform shows the sense voltage $V_S$, which is a scaled version of the voltage at the input of the power supply 124. During the off-time each half-cycle, the input capacitor C1 of the power supply 124 charges and the sense voltage rises. During the first few cycles (a), (b), (c), the sense voltage remains above the first voltage threshold $V_1$.

During the fourth half-cycle (d), the sense voltage falls below the first voltage threshold $V_1$. The control circuit 114 decreases the on-time of the dimmed hot voltage during the next half-cycle (e) by the first time increment $t_1$. Thus, the input capacitor C1 has more time to charge during the off-time of the next half-cycle (e).

However, during the half-cycle (e), the sense voltage once again falls below the first voltage threshold $V_1$. So, the control circuit 114 decreases the on-time of the dimmed hot voltage during the next half-cycle (f) by the first time increment $t_1$. The cycle repeats again until the sense voltage does not fall below the first voltage threshold $V_1$ during the half-cycle (g).

Now, the on-time of the dimmed hot waveform is held constant through the next half-cycles (h), (i).

Figure 5:
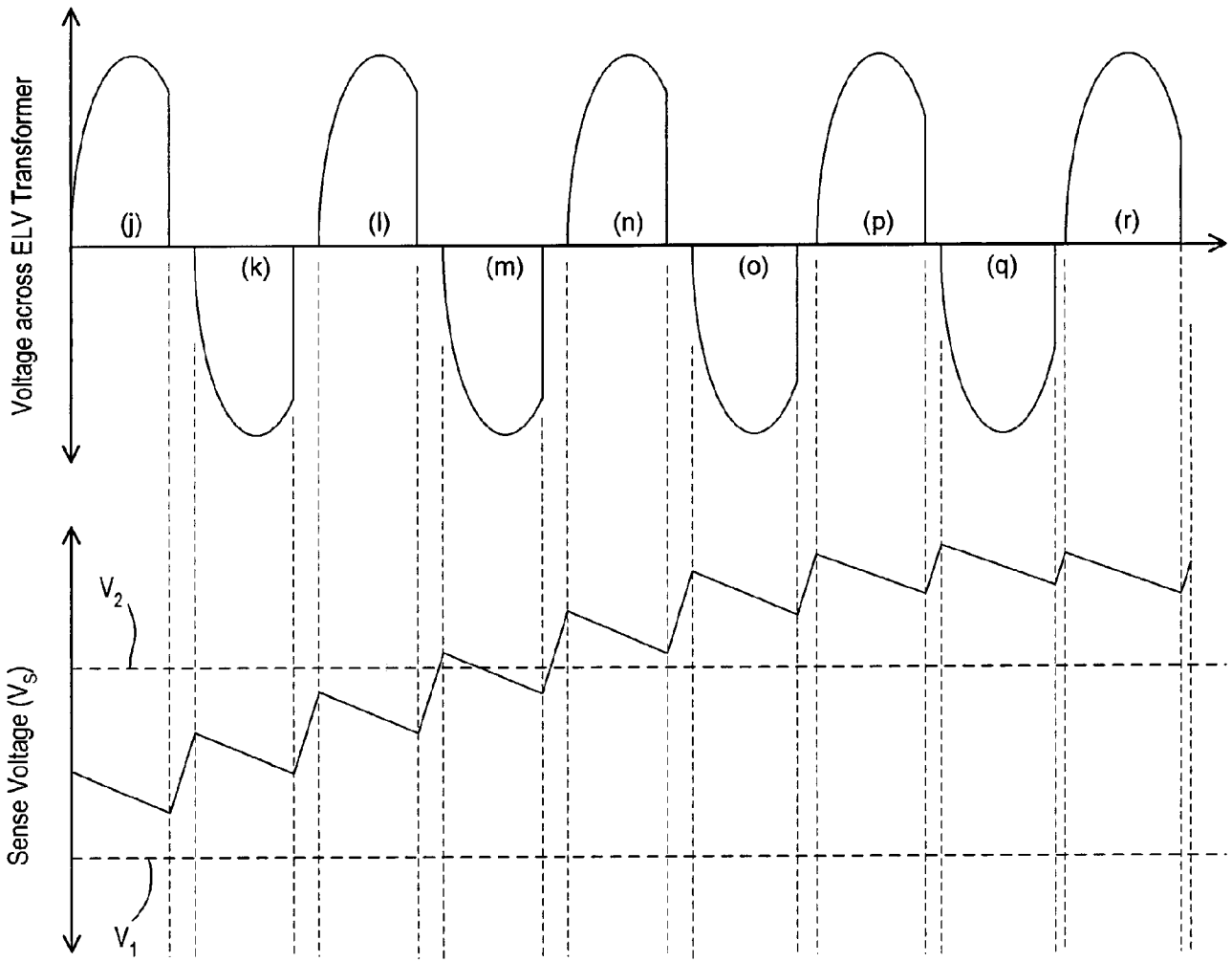
FIG. 5 shows voltage waveforms of the dimmer of FIG. 1 during a second part of the process of FIG. 3.

FIG. 5 shows the voltage waveforms of the dimmer 100 after a low-voltage condition has been detected and the sense voltage $V_S$ is rising. The on-time of the first few half-cycles (j), (k), (l), (m), (n) of the dimmed hot waveform (the upper waveform of FIG. 5) is the decreased on-time (that was determined from the description of FIG. 4). Now, the voltage at the input of the power supply 124, and thus the sense voltage $V_S$, is rising (as shown in the lower waveform of FIG. 5).

During half-cycle (n), the sense voltage remains above the second voltage threshold $V_2$. Therefore, the control circuit 114 increases the maximum on-time of the dimmed hot waveform during the next half-cycle (o) by the second time increment $t_2$. While the sense voltage continues to remain above the second voltage threshold $V_2$, the control circuit 114 continues increasing the maximum on-time each half-cycle by the second time interval $t_2$ until the maximum on-time is equal to the original maximum on-time.

The dimmer 100 of the present invention has been described such that the control circuit 114 is operable to change the maximum on-time $t_{ON\text{-}MAX}$ from one half-cycle to the next. However, it may be preferable to only change the maximum on-time $t_{ON\text{-}MAX}$ from one line-cycle to the next. Many dimmers are operable to drive multiple types of lighting loads. Some lighting loads, such as magnetic low-voltage (MLV) lighting loads, are susceptible to asymmetries that produce a DC component in the voltage across the load. For example, the magnetic low-voltage transformers required for MLV lighting may saturate and overheat when the load voltage has a DC component. When the on-time is changed from one half-cycle to the next, the voltage across the lighting load with be asymmetric and a DC component will be present in the voltage. On the other hand, when the on-time is only changed from one line-cycle to the next, the load voltage will remain symmetric and the problem of saturating or overheating the MLV transformer will be avoided.

While the dimmer 100 of the present invention was described primarily in regards to control of ELV loads, the dimmer may be used to control other load types, for example, incandescent or MLV loads.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A two-wire dimmer for control of a lighting load from a source of AC voltage, comprising:

a semiconductor switch operable to be connected between said lighting load and said source of AC voltage; said semiconductor switch having a conducting state and a non-conducting state;

a power supply operable to draw current from said source of AC voltage when said semiconductor switch is in said non-conducting state; and a control circuit operable to control said semiconductor switch into said conducting state for an on-time each half-cycle of said AC voltage; said control circuit coupled to [an input of] said power supply for monitoring a voltage of said power supply;

wherein said control circuit is operable to decrease said on-time when said [input] voltage of said power supply falls below a first predetermined voltage threshold.

2. The two-wire dimmer of claim 1, wherein said power supply has an input for receipt of an input voltage and said control circuit is coupled to said input of said power supply for monitoring said input voltage of said power supply.

3. The two-wire dimmer of claim 2, wherein said control circuit is operable to decrease said on-time by a first predetermined time interval.

4. The two-wire dimmer of claim 3, wherein said control circuit is operable to increase said on-time when said input voltage of said power supply remains above a second predetermined voltage threshold.

5. The two-wire dimmer of claim 4, wherein said control circuit is operable to increase said on-time by a second predetermined time interval.

6. The two-wire dimmer of claim 5, further comprising a resistive voltage divider for providing a scaled-down representation of said input voltage of said power supply to said control circuit.

7. A method [for controlling the intensity of a lighting load from a source of AC voltage in a dimmer comprising a semiconductor switch coupled between said lighting load and said source, a control circuit for controlling said semiconductor switch, and a power supply for powering said control circuit;] *of ensuring that a power supply for powering low-voltage circuitry of a dimmer is able to properly charge, the dimmer adapted to be coupled between a source of AC voltage and a lighting load,* said method comprising the steps of:

[scaling down a voltage of said power supply to produce] *producing* a sense voltage *in response to a voltage of said power supply*;

measuring said sense voltage;

comparing [the] *said* sense voltage to a first predetermined voltage threshold; and changing a conduction time of said [semiconductor switch] *dimmer* based on the result of the step of comparing, *such that said power supply has enough time to charge*.

8. The method of claim [7] *11*, wherein said voltage of said power supply comprises an input voltage of said power supply.

9. The method of claim [8] *11*, wherein changing said conduction time comprises decreasing said conduction time by a first predetermined time when said sense voltage falls below said first predetermined voltage threshold.

10. The method of claim 9, further comprising the steps of:

comparing said sense voltage to a second predetermined voltage threshold;

increasing said conduction time by a second predetermined time when said sense voltage rises above said second predetermined voltage threshold.

*11. The method of claim 7, wherein the step of producing a sense voltage in response to a voltage of said power supply further comprises scaling down said voltage of said power supply to produce said sense voltage.*

* * * * *